Patented Sept. 30, 1952

2,612,498

UNITED STATES PATENT OFFICE 2,612,498

SULFATION OF ALGINIC ACID IN ALCOHOLIC SULFURIC ACID

Harvey E. Alburn, Philadelphia, Pa., assignor to Wyeth Incorporated, Philadelphia, Pa., a corporation of Delaware No Drawing. Application September 19, 1950, Serial No. 185,698

2 Claims. (Cl. 260—209.6)

This invention relates to the sulfation of alginic acid in alcoholic sulfuric acid disclosed but not claimed in my copending patent application for Improvement in Alginic Acid Sulfate Production, Serial No. 163,073, filed May 19, 1950, of which this application is a continuation in part.

In U. S. Patent No. 2,508,433 to Eric G. Snyder for Alginic Acid Sulfate Anti-Coagulant, a process is disclosed for producing alginic acid sulfate and its salts for use as a blood anticoagulant. This process involves precipitating and drying commercial alginic acid, sulfating it under substantially anhydrous conditions with a sulfating agent such as chlorosulfonic acid in the presence of an acid acceptor such as pyridine, and recovering the desired salt, e. g. the sodium salt, from the sulfation mixture.

The sulfation step in the above process involves the use of chlorosulfonic acid and relatively large amounts of pyridine (19 parts by volume of pyridine to one part by weight of alginic acid). It also involves the extra steps of isolating the pyridinium salt of alginic acid sulfate and its conversion to the sodium salt.

According to my present invention the sulfation is accomplished by suspending alginic acid in a cold solution of a lower aliphatic alcohol, preferably methanol, and concentrated sulfuric acid, e. g. a solution cooled to a temperature range of —35° C. to —15° C., heating the mixture to a sulfating temperature and isolating the alginic acid sulfate from the sulfation mixture.

Alginic acid and its derivatives are polymeric materials and like most such materials, contain molecules of differing degrees of polymerization. Since molecules of varying molecular weight appear to have varying physiological effect, variations in molecular weight distribution sometimes result in batches of undesirable toxicity-therapeutic effect ratio.

Greatly improved constancy of product having a more desirable ratio of therapeutic to toxic dosage is attained by partially depolymerizing the alginic acid either before or after sulfation.

The alginic acid may be made from the edible grade of sodium alginate by dissolution in about 75 parts of water, precipitation by about 1.6 parts of 1:1 hydrochloric acid, washing with water to pH 2.5–3.0 and air drying.

The depolymerization can be carried out in a variety of ways, for example, by heating moist commercial alginic acid, by treating an aqueous solution of sodium alginate with ascorbic acid and slowly adding hydrogen peroxide, by heating a suspension of alginic acid in 90% formic acid, by refluxing moist alginic acid suspended in pyridine, or by heating a suspension of alginic acid in water containing small amount of dissolved calcium chloride or other activating agent such as hydrochloric acid or boric acid, at or near the boiling point.

In a preferred embodiment of my invention, I sulfate the alginic acid after depolymerization, using the following process: I vigorously disperse the alginic acid in a cold solution of a lower aliphatic alcohol, preferably methanol, and concentrated sulfuric acid, e. g. a solution cooled to —35° C. to —15° C., heat the mixture to reaction temperature, preferably 5° C.–30° C., maintaining said temperature until the reaction is substantially complete, and then quench the reaction mixture in a quantity of crushed ice. The progress of the sulfation can be followed by the dissolution of the alginic acid, which is usually substantially complete in about 5 minutes. To prevent excessive dilution of the alginic acid sulfate solution by the use of large amounts of ice, I have found it helpful to supercool the quenching ice by keeping it surrounded by a bath of Dry Ice or other suitable cooling medium.

At this stage of the process, the alginic acid is in the form of the soluble sulfate in an acid solution. In order to facilitate the isolation of the product in the preferred form of the desired soluble salt, the solution is neutralized with a suitable basic reagent. For example, the solution can be neutralized with a suitable base to yield the soluble sodium, ammonium or potassium salts, the somewhat less soluble calcium salt or the still less soluble heavy metal salts. For normal therapeutic use I prefer to prepare the sodium salt by neutralizing first with 50% NaOH, followed by 1 N NaOH, to pH 7. However, in a supercooled solution, $Na_2SO_4$ tends to crystallize out on the walls of the container hindering cooling of the mixture during neutralization, and in such circumstances the use of $NH_4OH$ may be indicated. The ammonium salt formed can be used therapeutically or can be converted into the preferred sodium salt.

Although fuming sulfuric acid could be used to effect the sulfation, charring of the alginic acid may occur to some extent and I prefer to use the C. P. grade of concentrated $H_2SO_4$ having a sp. gr. of 1.84 and a strength of 96–98%.

The solution of alginic acid sulfate thus prepared, contains large quantities of inorganic salts which I prefer to remove from solution by means of a dialysis which can be conveniently carried out in a countercurrent dialyzer making use of cellophane diaphragms. The dialysis will also remove low molecular weight alginic acid sulfate.

The alginic acid sulfate salt can be precipitated from the solution by the addition of a suitable organic solvent, as by the addition of four volumes of acetone to one of solution, followed by centrifuging and drying of the final product.

However, I prefer to improve the uniformity, molecular weight distribution and physiological properties of the product by effecting a fractional precipitation on the dialyzed solution by the addition of portions of a suitable solvent which will fractionally precipitate the higher molecular species. I have found the most effective agent to be a 90% solution of aqueous ethylene glycol saturated with sodium chloride. Such a solution added in suitable portions will first precipitate the higher molecular weight, more toxic fraction which can be separated and discarded.

Alternatively, I can first sulfate the alginic acid and then carry out the depolymerization and fractionation steps on the sulfated material.

The final product is tested for anticoagulant effect on rabbits and for toxicity on mice. A satisfactory product conforms to all the tests for heparin in New and Non-Official Remedies, 1949, page 620, except that it gives no test for nitrogen, which is absent from the molecule. For therapeutic use, the viscosity of the sodium salt of alginic acid sulfate in 1% aqueous solution lies preferably in the range 1.04–1.12 centipoises (Ostwald-Fenske pipette at 30° C.)

*Example*

Alginic acid is tested for suitability for use. It should contain less than 15% volatile matter and less than 3% ash; its solubility should be such that a 1% solution at pH 7.5 should be clear, to insure the exclusion of cellulose and other similar uncarboxylated polysaccharides that may be toxic.

A portion of alginic acid is depolymerized as follows: 100 grams of alginic acid is suspended in 600 ml. 90% formic acid and heated at 96° C. for 30 minutes. The mixture is cooled and centrifuged. The residue is washed with denatured ethanol and dried.

Twenty grams of the partially depolymerized alginic acid is added with vigorous stirring to a solution of 20 ml. of methanol and 300 ml. of concentrated $H_2SO_4$ (C. P. grade—1.84 sp. gr.— 96–98% $H_2SO_4$) previously cooled to $-20°$ C.

With continued stirring the mixture is heated to 5° C. and held at that temperature for 5 minutes at which time all the alginic acid is dissolved. The solution is cooled to $-15°$ C. and quenched in 2 liters of crushed ice. The solution is partially neutralized with 50% NaOH and brought to pH 7 with 1 N NaOH.

The solution is dialyzed for 16 hours in a countercurrent dialyzer, then reconcentrated in vacuo at a temperature under 50° C. to an approximately 10% concentration. The alginic acid sulfate salt is precipitated by the addition of 4 volumes of acetone and filtered off. The precipitate is washed with acetone and dried.

I claim:

1. The method of producing salts of alginic acid sulfate which comprises suspending alginic acid in a mixture of a lower aliphatic alcohol and concentrated sulfuric acid held in the approximate temperature range of $-35°$ C. to $-15°$ C., heating said suspension to the reaction temperature range of 5° C. to 30° C. for approximately 5 minutes, quenching said solution in crushed ice, neutralizing said solution to approximately pH7, precipitating the salt of alginic acid sulfate by the addition of acetone to the solution, and separately collecting the precipitate.

2. The method of producing the sodium salt of alginic acid sulfate which comprises suspending alginic acid in a mixture of methanol and concentrated sulfuric acid held in the approximate temperature range of $-35°$ C. to $-15°$ C., heating said suspension to the reaction temperature range of 5° C.–30° C. for approximately 5 minutes, quenching said solution in crushed ice, neutralizing said solution with sodium hydroxide to approximately pH 7, precipitating the sodium salt of alginic acid sulfate by the addition of acetone to the solution, and separately collecting the precipitate.

HARVEY E. ALBURN.

REFERENCES CITED

The following references are of record in the file of this patent:

UNITED STATES PATENTS

| Number | Name | Date |
| --- | --- | --- |
| 1,951,784 | Bertsch | Mar. 20, 1934 |
| 1,951,785 | Bertsch | Mar. 20, 1934 |
| 2,508,433 | Synder | May 23, 1950 |